Nov. 13, 1962 K. G. KING 3,064,139
CONSTANT ELECTRIC CURRENT POWER SUPPLIES
Filed Oct. 15, 1958 5 Sheets-Sheet 1

Inventor:
Kenneth Gordon King
By Attorneys

Nov. 13, 1962  K. G. KING  3,064,139
CONSTANT ELECTRIC CURRENT POWER SUPPLIES
Filed Oct. 15, 1958  5 Sheets-Sheet 3

Inventor:
Kenneth Gordon King
By Attorneys

Nov. 13, 1962 K. G. KING 3,064,139
CONSTANT ELECTRIC CURRENT POWER SUPPLIES
Filed Oct. 15, 1958 5 Sheets-Sheet 4

Inventor:
Kenneth Gordon King
By
Attorneys

Nov. 13, 1962 K. G. KING 3,064,139
CONSTANT ELECTRIC CURRENT POWER SUPPLIES
Filed Oct. 15, 1958 5 Sheets-Sheet 5

Inventor:
Kenneth Gordon King

By Attorneys

United States Patent Office 3,064,139
Patented Nov. 13, 1962

3,064,139
CONSTANT ELECTRIC CURRENT POWER
SUPPLIES
Kenneth G. King, London, England, assignor to Westinghouse Brake & Signal Company Limited, London, England
Filed Oct. 15, 1958, Ser. No. 767,315
Claims priority, application Great Britain Oct. 16, 1957
6 Claims. (Cl. 307—58)

This invention relates to constant electric current power supply systems and, more particularly, to such systems suitable for the supply of constant direct current to a submarine telephone cable having repeaters spaced at intervals along its length, the voltage being substantially, but not necessarily exactly, constant.

According to the invention electric power supply apparatus for supplying a constant unidirection current to a variable load circuit from an A.C. supply comprises at least two sets of constant current rectifier means each having associated reference devices, the sets being maintained operative at all times on their normal working characteristics by a voltage sharing or compounding circuit arrangement having means responsive to the output of each said set and effective to feed a signal to said reference devices to adjust automatically the output voltages of said sets to the values requisite to enable them to function at the same current value.

Depending on the load (the length of the cable) the total voltage may be supplied entirely from sets of equipment located in one place, or it may be necessary to have separate sets of equipment, spaced apart, with the total load voltage divided between them. In both cases the circuit consists of a single conductor in the cable and a sea "earth" return, no other connections between the power supplies being possible in the case of a cable supplied from both ends.

In both cases the power supply equipment at one location may comprise at least two sets working together to provide standby and maintenance facilities, and the power supply must be maintained in the event of failure or withdrawal of one set.

In the case of the supply being made at both ends, it may be desired to ensure that the total voltage across the cable is shared approximately equally between the power supplies at the two locations in order to reduce the maximum voltage stress to earth in the cable.

It may also be desired to provide the power supplies with voltage-limiting means to ensure that the voltage rating of the cable is not exceeded.

In the case of the supply being made at both ends, special arrangements may be required to provide that when the power supplies are switched on, the current in the load does not remain for an excessive time in a region between the normal value and a specific fraction of the normal value: (for example, if the normal current is 300 ma., the region from 100 ma. to 294 ma. may be regarded as a "danger zone" in which the current must not lie for more than a stated time). It will be seen that when voltage limiting and sharing arrangements are provided as above, this means that the power supplies at the two locations must be switched on in rapid sequence under control from one location only.

The invention will now be described, by way of example, with reference to the accompanying drawings, in which.

Figure 2:
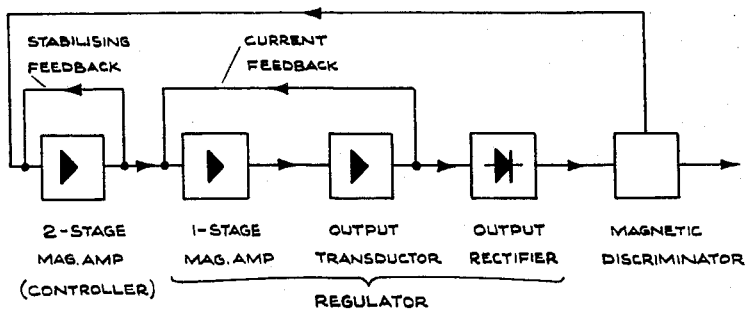
Figure 3:
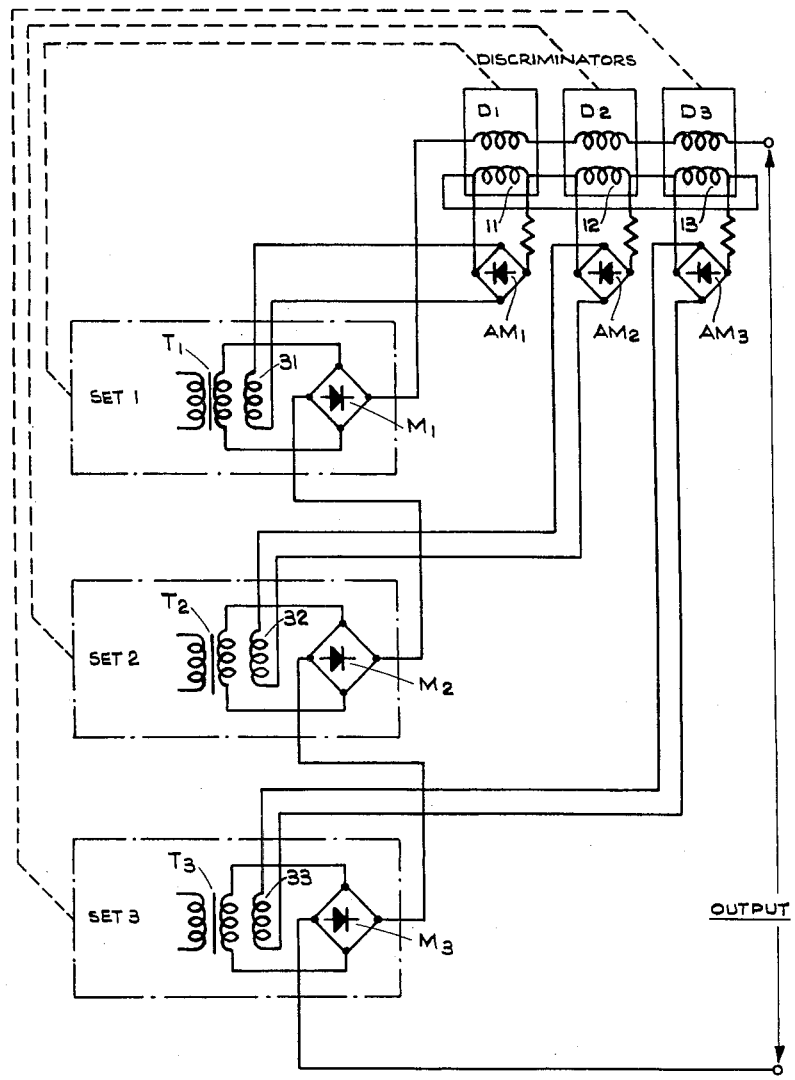
Figure 4:
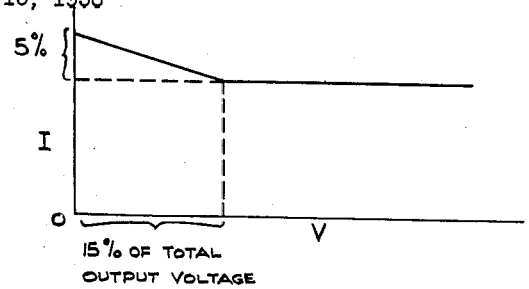
Figure 5:
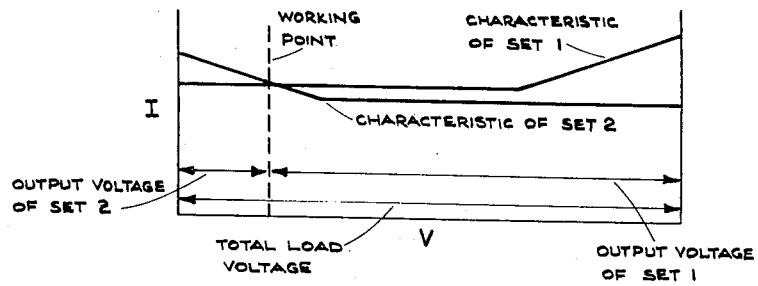
Figure 6:
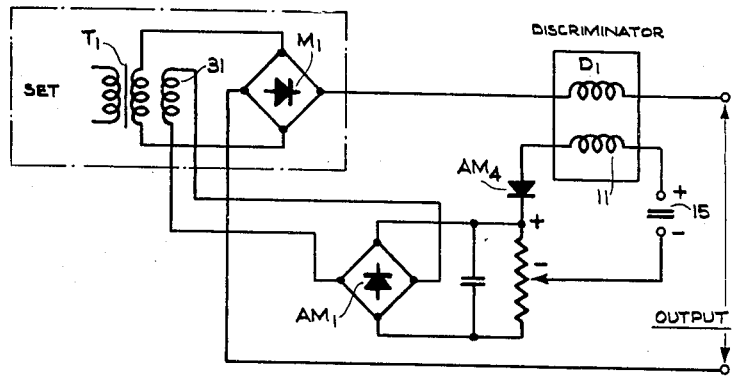
Figure 7:
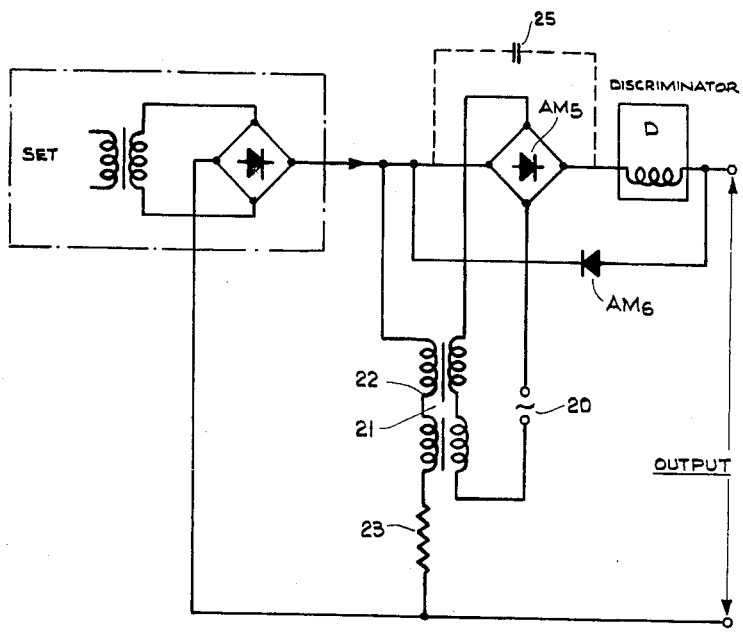
Figure 8:
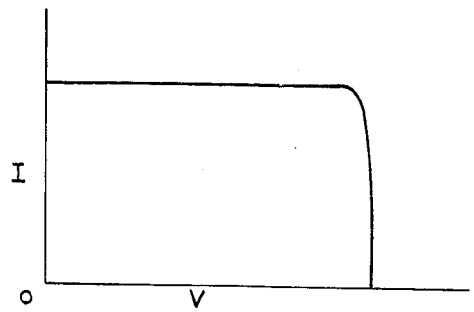
Figure 9:
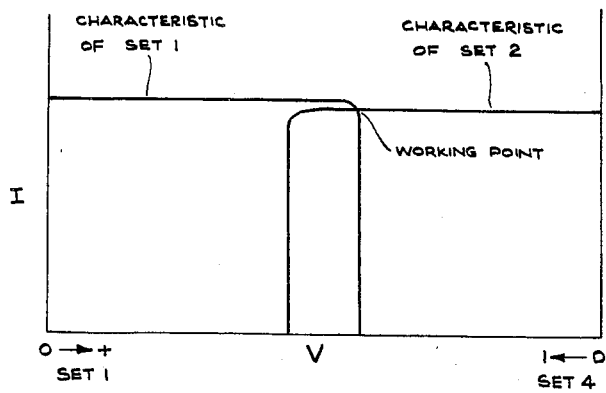
Figure 10:
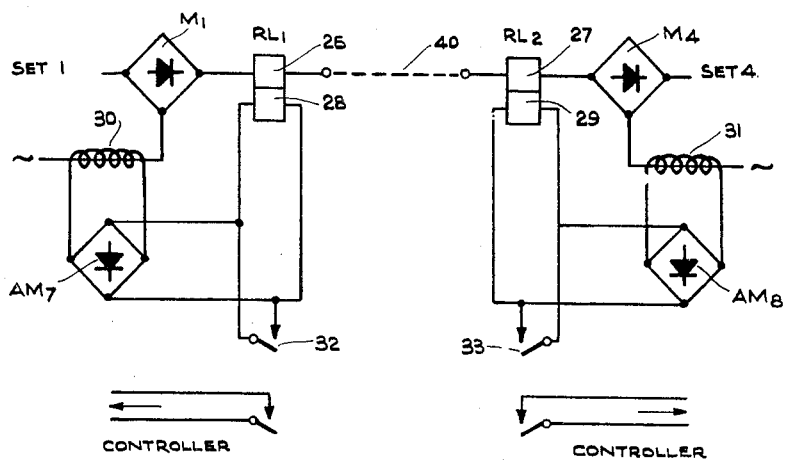

FIG. 2 illustrates a constant-current rectifier set of a type which may be embodied in the system, FIG. 3 shows a circuit of one form of a voltage sharing arrangement which may be incorporated in the system, FIG. 4 illustrates the characteristic of a rectifier set when a partial voltage compounding arrangement is employed in the system, FIG. 5 illustrates the superimposed characteristics of two rectifier sets operating in series in a voltage compounding arrangement such as may be employed in the system, FIG. 6 shows a circuit for producing the partial compounding characteristics of the power supply, FIG. 7 show a voltage limiting circuit arrangement which may be used when the load, e.g. cable, is supplied from both ends, FIG. 8 illustrates the characteristic obtained when the reference device functions to control the load voltage rather than the load current, FIG. 9 illustrates the superimposition of two typical characteristics of two rectifier sets supplying the load from two locations and arranged to voltage limit at just over half the total voltage required by the load, and FIG. 10 shows the switching arrangements for switching on two sets of rectifiers, assumed to be remote from each other.

Figure 1:
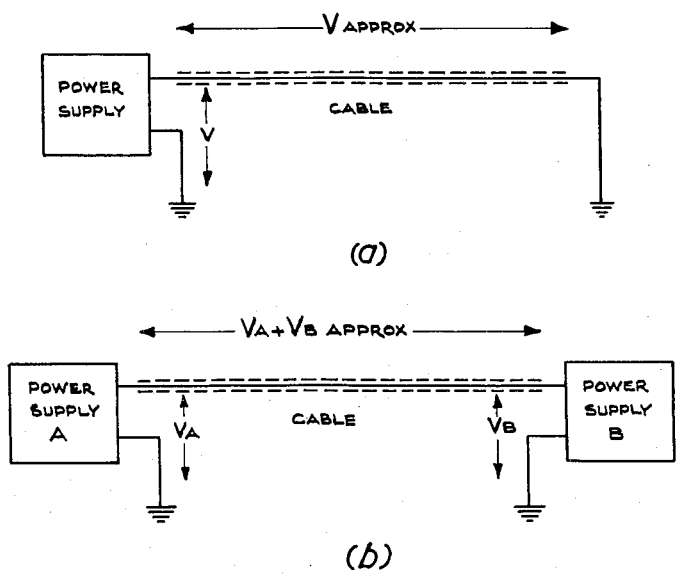
FIG. 1(a) shows a cable supplied entirely from one end.
FIG. 1(b) shows a cable supplied from both ends.

Referring now to FIGS. 1(a) and 1(b) the former shows a submarine cable supplied with power entirely from one end from a suitable power supply, the voltage V over the whole length of the cable being approximately the same as that between the cable and earth; and the latter showing a submarine cable supplied with power from each end and from separate power supplies A and B, the voltage over the whole length of the cable being approximately the sum of the outputs VA and VB from the supplies A and B.

One suitable type of constant-current rectifier set round which the system may be built is illustrated by way of example by FIG. 2. The primary function of the circuit is to supply constant direct current to a variable load, from an A.C. supply of variable voltage and frequency. The main features of the circuit are as follows:

(i) The set is divisible into two main sections—a controller and a regulator—the controller having a relatively long time constant and the regulator having a relatively short one.

(ii) Two D.C. feedback loops are provided (apart from subsidiary derivative stabilising feedback circuits), one over the whole set through a reference device and the other over the regulator section only, so that the controller works with a substantially constant output, providing very high accuracy and a transient response dependent only on the short time-constant of the regulator section.

As indicated in FIG. 2, the controller and regulator sections are both magnetic amplifiers with two stages each, and the reference device is a magnetic discriminator, but the principles described below are, in general, applicable to current regulators of other types, e.g., using electromechanical regulators, or reference circuits embodying non-linear resistors, reference batteries, contact ammeters, etc. Moreover, the system shown in FIG. 2 might be modified in detail, e.g., where conditions permit, one or two stages of amplification might be dispensed with, or the current feedback in the regulator section might be derived from the output of the rectifier, through an auxiliary transductor (D.C. current transformer).

Where a plurality of sets is provided at each location, in order to allow them to work under similar conditions at all times, their outputs are connected in series rather than in parallel, and means are provided to allow for different current settings in sets working together. If, for example, two sets of the form shown in FIG. 2 are connected in series, the set whose discriminator is adjusted to the higher current setting will tend to contribute the whole of the required voltage, and the other set may be driven off its normal working characteristic to such effect that if the first set should fail for any reason, an excessively long time will be required for the second set to take over the load. The invention provides two alternative methods of overcoming this by ensuring that both or all the sets are at all times operating on their normal working characteristics, namely by voltage sharing or by partial compounding.

One method of voltage sharing is illustrated in FIG. 3, which shows three sets working in series, each with its associated magnetic discriminator. A tertiary winding 31, 32, 33, on the output transformer T1, T2, T3 of each set, or a secondary winding of a special transformer connected across the A.C. input terminals to the output rectifier M1, M2, M3 feeds a small auxiliary rectifier AM1, AM2, AM3, whose D.C. output voltage is thus a measure of the output voltage of the set; the output voltage of each of these auxiliary rectifiers is connected through a resistor to an auxiliary control winding 11, 12, 13, on the associated discriminator D1, D2, D3, and these auxiliary windings of all the discriminators are connected in series in a ring. The current in any particular discriminator auxiliary windings is therefore the difference between the output currents of its associated auxiliary rectifier and the next one, and the sense in which the windings are connected is such that a set giving a higher output voltage than the average has its output reduced by the current in its auxiliary discriminator winding. The ultimate value of the output current with voltage sharing in operation is the average of the current settings of the individual sets, since the sum of the voltages across all the discriminator auxiliary windings round the loop must be zero.

Possible variations of this circuit are as follows:

Where reference devices are used which have not the facility of an auxiliary, isolated, control input circuit, such as a non-linear resistance bridge, or where it is not desired to make use of such facilities, the discriminator auxiliary windings may be replaced by auxiliary control input circuits on the input stages of the controller, or by shunts in series with the outputs from the reference devices, or by other arrangements capable of combining the inputs from the reference devices and the voltage sharing circuits.

Instead of taking the A.C. input voltages to the main rectifiers as a measure of the D.C. output voltages, a more direct relationship may be established by supplying the auxiliary rectifiers from transductors whose control windings are energised from the D.C. output voltages of the associated sets. In this case it is possible, though not necessarily desirable, to dispense with the resistors in the output circuits of the auxiliary rectifiers.

Where partial compounding is employed, the characteristic of each set is modified to the form shown in FIG. 4 with typical proportions indicated. By this means the sets automatically adjust their output voltages to the values required enable them all to work at the same current. This is illustrated in FIG. 5, where the characteristics of two sets operating in series are superimposed, and the working point is seen to be the point of intersection of the two characteristics. Thus, a set which is adjusted to give a lower current is not completely cut off, but gives a low voltage at a point on its characteristic where its output current is increased by the compounding effect. The system works equally well with more than two sets.

In the case of sets operating in series with partial compounding it may be desirable to depress the output of a set prior to withdrawal. If the set which is supplying most of the load voltage is switched off, the remaining set or sets will take over with a delay due to the finite response time of the regulators, resulting in a large transient fall in load current lasting perhaps ⅓ second in a practical case. This transient is not at all serious but it may be preferable to avoid it or reduce it very greatly by ensuring, before switching off a set, that it is not supplying most of the load voltage. This is achieved by injecting a small voltage actually or effectively in series with, or a small current in parallel with, the signal from the current sensing device (e.g. the magnetic discriminator) to the controller; the injected signal is in a direction to reduce the output current of the set, and its output voltage is therefore reduced (at a relatively gentle rate owing to the time lag in the controller) until most or all of the load voltage is supplied by the remaining sets. In an alternative arrangement, if a magnetic discriminator is used, the disturbing signal may be applied to an auxiliary control winding on the discriminator.

Compared with the voltage-sharing system, the partial compounding method has the advantage that if one set fails, the remaining sets maintain the current at the normal level, whereas the voltage-sharing the current level is depressed by the efforts of the sharing circuit to maintain equal output voltages from the operative and inoperative sets. Another advantage is that no interconnections between different sets or reference circuits are required. It should be noted, however, that the system is only applicable in cases where the load voltage does not vary over more than a narrow range, so that the output current level is not affected by compounding at the low-voltage ends of the characteristics of the sets.

A method of achieving the desired characteristic is shown in FIG. 6. The auxiliary winding 11, 12, 13, (FIG. 3) on the magnetic discriminator D1, D2, D3, associated with each set is connected through a rectifier AM4 (FIG. 6) to a substantially constant D.C. voltage source 15 which is progressively backed off as the output voltage from the set increases up to about 15% of the total voltage at the location, beyond which point the rectifier AM4 goes on to its reverse characteristic and no appreciable current flows in the auxiliary discriminator winding 11. Since the modification of the characteristic at the low-voltage end does not affect the current level under operating conditions, it is not critical, and the substantially constant D.C. voltage may in practice be derived directly from the mains.

The variations possible in this circuit are the same as those described above for the voltage-sharing circuit. In addition a number of different rectifier gate circuits could be utilised to fulfil the same function of introducing a disturbing signal into the reference circuit which is progressively reduced by increasing the set output voltage.

When the cable is supplied from both ends, voltage-sharing between locations may be achieved by a voltage-limiting system of which the circuit is shown in FIG. 7.

An auxiliary bridge rectifier AM5 is connected in series with the reference device D, such as a magnetic discriminator, and the A.C. terminals of this rectifier are connected to a source of alternating current 20 in series with a transductor 21, preferably of the series type, whose control winding 22 is energised through a resistor 23 from the D.C. output voltage of the set, so that the alternating current supplied to the bridge rectifier AM5 is proportional to the set output voltage. So long as the transductor current is not greater than the normal set output current it has no effect, but if it exceeds the normal set output current the output current from the bridge rectifier becomes dependent only on the transductor current (and hence on the set output voltage) and not on the load current. Under these conditions, therefore, the reference device functions to control the load voltage rather than the load current, and a characteristic of the kind shown in FIG. 8 is obtained. An additional half-wave rectifier AM6 is necessary to provide a low resistance return path for the transductor output current under voltage limiting conditions.

In some cases it may be considered that the A.C. input voltage to the main rectifier is a sufficiently accurate measure of the D.C. set output voltage; if so, the transductor in FIG. 7 may be replaced by an impedance (e.g. resistor, choke, etc.) fed from the input voltage to the main rectifier through a suitable isolating means, e.g. a transformer.

To improve the sharpness of the bend in the characteristic at the voltage-limiting point, a condenser 25 may be connected across the D.C. terminals of the auxiliary bridge rectifier, or a more elaborate smoothing circuit may be used.

When the equipment is supplied from a number of separate alternators, any of which might be inoperative at some time, it is necessary to ensure that there is always a power supply to the voltage limiting circuit by providing as many voltage limiting transductors as there are separate A.C. supplies.

When the load is supplied from two locations the power supplies at each location are arranged to voltage-limit at a little over half the total voltage required by the load. Assuming then that the supplies at the two locations cannot in practice be set to control at precisely the same current level, the supply which is set to the higher level tends to contribute the greater part of the load voltage, and therefore runs on to its voltage-limiting characteristic, while the other supply determines the actual current level. This is illustrated by superimposing two typical characteristics, as in FIG. 9. The two supplies may be deliberately set up to different current levels, or they may be left to decide between themselves which takes over the greater part of the voltage.

It may be desired to have an indication of the existence or degree of inequality, between the current in the live and earthy sides of the supply, particularly if measurements of current are made in the earthy side. A suitable current balance indicator for this purpose may take the form of a push-pull magnetic amplifier or transductors with the live and earthy currents passing in opposition through separate but electrically identical control windings. The degree of unbalance is indicated on a meter and a relay may be used to give an indication when the unbalance reaches a certain figure whilst a proving relay may be provided to prove continuity of the circuit. Alternatively the transductors could be series connected, and could have self-excitation.

Further magnetic discriminators may be used with associated amplifiers for providing over-and-under current alarms. In a preferred arrangement the output from the discriminator feeds into a two-stage push-pull magnetic amplifier provided with D.C. negative feedback through a resistor and also with derivative feedback through a capacitor. Assuming the gain of the amplifier without feedback to be very high, the effective time-constant is then approximately the product of the values of feedback resistance and capacitance. If a suitable relay is connected to the output of the amplifier its contacts may be made to close with an output from the discriminator corresponding to a predetermined deviation of the line current from the normal value, and an inverse current/time relationship is achieved, approximately, as a result of the amplifier time constant. If desired, a number of relays, operating at different levels, may be connected to the amplifier output, and these relays may operate circuit-breakers through timers. In a typical arrangement, for example, there may be three relays, one operating at a 1% current deviation, the second at 3%, and the third at 7½%, the first two operate circuit-breakers through timers set to 1 hour and 1 minute respectively, while the third does so directly with a delay dependent on the amplifier time constant, which is made about 15 seconds in a typical example.

On switching on, if the load is supplied from two locations with the voltage-limiting arrangement described above to ensure that the maximum voltage stress to earth in the load is restricted to little more than half the total load voltage, and the power supply is switched on at one location only, the voltage-limiting circuit will function to the effect that the load is supplied with about half its normal voltage, and therefore with about half its normal current. As explained above, it may be considered very undesirable to permit this condition to be maintained for more than a short period (a few seconds); the following switching-on system, however, enables the load current to be brought up to its normal level quickly, under control from one location only, or else left at a safe low level if for any reason the power supplies at the two locations are not both able to contribute their share of the power.

It is necessary to design the basic constant-current set, referred to above, in such a way that it is capable of giving, alternatively, its normal output current or an uncritical fraction of it—say, 20%. In the type of set described above, the reduced current supply can be conveniently arranged by switching off the power supply to the "controller" section, when the output current is substantially the magnetising current of the output transductor, which can be arranged to be of the right order.

Referring now to FIG. 10 which shows two sets, assumed to be remote from each other, supplying the load 40 in series, associated with the output rectifier M1, M4 of each set is a differential relay RL1, RL2 (i.e. a relay with two separate operating windings, responsive to the difference between the energisation of the two windings) one of whose windings 26, 27 is connected in series with the output from the rectifier M1, M4 while the other winding 28, 29 is energised from the alternating input current to the rectifier, preferably through a current transformer 30, 31 and rectifier AM7, AM8. When a set is supplying power to the load, the input and output currents of the output rectifier M1, M4 are substantially equal, so that there is no tendency for the associated relay to pick up although it may be necessary to connect shunt rectifiers across the windings of the relays RL1 and RL2 in order to maintain equality of currents in the two windings with peaky waveforms. When the load current supplied by the other set exceeds the current supplied by the first set by a significant margin, the alternating and direct current in the output rectifier are unequal, and the relay picks up. Once it has picked up it is held by a front contact 32, 33 which short-circuits the direct current supplied from the rectifier.

The sequence of events in switching on is as follows:

i. Set 1 is switched on and initially supplies about 20% of normal current to the load, its controller not being energised. Relay RL1 does not pick up, since it is energised equally in both windings, but relay RL2 picks up and prepares a circuit to energise the controller of set 4, when the mains supply to that set is switched on. The circuit can safely be left in this condition indefinitely.

ii. When the supply to set 4 is switched on, its controller is energised due to the operation of relay RL2, and the set supplies to the load the maximum current possible under voltage-limiting conditions—i.e. about half normal current. This is a condition which must not be unduly prolonged.

iii. With the load current at about half normal level, the windings of relay RL1 are energised unequally, and the relay therefore picks up and energises the controller of set 1, whereupon the load current is raised to its normal level. This part of the process need take no more than a few seconds.

In alternative switching-on arrangements the relays may be used, not merely to switch the mains supplies to the controllers, but to switch the entire sets, so that one set may be controlled completely from the other location.

The relays may be controlled through active components such as transductors, transistors, etc., and may have only a single winding operated from suitable differential circuits. Furthermore, the relays may be replaced by static components, such as transductors or transistors, with suitable modifications to the circuits.

Having thus described my invention, what I claim is:

1. Electric power supply apparatus for supplying a constant unidirectional current to a variable load submarine cable circuit at both ends comprising the combination of at least two sets of constant current rectifier means spaced apart with the total load voltage shared between them and each including a controller section and a regulator section; magnetic discriminator reference devices associated with each said set; voltage limiting circuit means comprising auxiliary bridge rectifier means connected in series with said reference devices; a source of alternating current connected to the A.C. terminals of said bridge rectifier means and in series with transductor control means; the D.C. output voltage of each said set being fed to said transductor control means through a resistor to control the alternating current supplied to said bridge rectifier proportionately to the output voltage of each said set and thereby adjust the output voltages of said sets to the values requisite to enable them to function at the same current value; and half-wave rectifier means providing a low resistance return path for the output current of said transductor control means.

2. Electric power supply apparatus as recited in claim 1, and further comprising over-and-under current alarms comprising magnetic discriminator means feeding push-pull magnetic amplifier means; a resistor providing a D.C. negative feedback path to said magnetic amplifier means; a capacitor providing a derivative feedback path to said magnetic amplifier means; and at least one relay operable upon a predetermined deviation of the line current from its normal value.

3. Electric power supply apparatus for supplying a constant unidirectional current to a variable load submarine cable circuit at both ends comprising the combination of at least two sets of constant current rectifier means spaced apart with the total load voltage shared between them and each including a controller section and a regulator section; magnetic discriminator reference devices associated with each said set; voltage limiting circuit means comprising auxiliary bridge rectifier means connected in series with said reference devices; a source of alternating current connected to the A.C. terminals of said bridge rectifier means and in series with transductor control means; the D.C. output voltage of each said set being fed to said transductor control means through a resistor to control the alternating current supplied to said bridge rectifier proportionately to the output voltage of each said set and thereby adjust the output voltages of said sets to the values requisite to enable them to function at the same current value; differential switching relay means associated with each said set; and a first operating winding and a second operating winding on each said relay means; the said first winding being connected in series with the D.C. output from its associated set and the said second winding being connected to the A.C. input to said set.

4. Electric power supply apparatus for supplying a constant unidirectional current to a variable load circuit comprising at least two sets of constant current rectifier means; an associated current regulator reference device for each set; a voltage sharing circuit arrangement for maintaining each said set operative throughout operation of the set on the normal working characteristic thereof; control windings for the voltage sharing circuit arrangement auxiliary to said regulator reference devices and responsive to the output of each set; said control windings being connected in series in a ring circuit and arranged to feed a respective signal to each said regulator reference device to automatically adjust the output voltage of each of the sets to a value for each said set to function at the same current output value.

5. Electric power supply apparatus as recited in claim 4, having an initial controller and a succeeding regulator comprising each set, each regulator being adapted to provide an output to a magnetic discriminator forming the current regulator reference device of the respective set, the voltage sharing circuit arrangement having circuit means for feeding auxiliary rectifiers, the D.C. outputs thereof being arranged for connection to the auxiliary control windings.

6. Electric power supply apparatus for supplying a constant unidirectional current to a variable load circuit comprising at least two sets of constant current rectifier means each said set having an initial controller and a succeeding regulator, each regulator being adapted to provide an output to a magnetic discriminator forming a current regulator reference device of the respective set and each controller having an auxiliary control input circuit combining the inputs from the reference devices; a voltage sharing circuit arrangement for maintaining each said set operative throughout operation of the set on the normal working characteristic thereof and having circuit means, comprising transductors whose control windings are energised from the D.C. output voltages of the associated sets, for feeding auxiliary rectifiers, the D.C. outputs of said auxiliary rectifiers being arranged for connection to control winding for the voltage sharing circuit arrangement auxiliary to said regulator reference devices and responsive to the output of each set; said control windings being connected in series in a ring circuit and arranged to feed a respective signal to each said regulator reference device to automatically adjust the output voltage of each of the sets to a value for each said set to function at the same current output value.

References Cited in the file of this patent

UNITED STATES PATENTS

| | | |
|---|---|---|
| 2,219,459 | Spencer | Oct. 29, 1940 |
| 2,495,783 | Sorensen | Jan. 31, 1950 |
| 2,594,019 | Holman | Apr. 2, 1952 |
| 2,810,876 | Huge | Oct. 22, 1957 |